(12) United States Patent
Edwards et al.

(10) Patent No.: US 12,471,970 B2
(45) Date of Patent: Nov. 18, 2025

(54) PLATE FOR TEMPORARILY BRIDGING FRAGMENTS OF A FRACTURE

(71) Applicant: Medartis Holding AG, Basel (CH)

(72) Inventors: Scott Graham Edwards, Scottsdale, AZ (US); Daniel Ebi, Niederdorf (CH); Julia Faschian, Laufenburg (DE); Simon Martin Schätzle, Gottenheim (DE)

(73) Assignee: Medartis Holding AG, Basel (CH)

( * ) Notice: Subject to any disclaimer, the term of this patent is extended or adjusted under 35 U.S.C. 154(b) by 375 days.

(21) Appl. No.: 17/634,297

(22) PCT Filed: Aug. 12, 2020

(86) PCT No.: PCT/EP2020/072657
§ 371 (c)(1),
(2) Date: Feb. 10, 2022

(87) PCT Pub. No.: WO2021/032571
PCT Pub. Date: Feb. 25, 2021

(65) Prior Publication Data
US 2022/0280211 A1    Sep. 8, 2022

(30) Foreign Application Priority Data
Aug. 16, 2019 (EP) .................... 19192018

(51) Int. Cl.
*A61B 17/80* (2006.01)
*A61B 17/16* (2006.01)
(Continued)

(52) U.S. Cl.
CPC ...... *A61B 17/8061* (2013.01); *A61B 17/1682* (2013.01); *A61B 17/1686* (2013.01);
(Continued)

(58) Field of Classification Search
CPC ... A61B 17/8061; A61B 17/808; A61B 17/84; A61B 17/80; A61B 17/8014;
(Continued)

(56) References Cited

U.S. PATENT DOCUMENTS 5,853,413 A * 12/1998 Carter ................. A61B 17/8061
606/281
2003/0060827 A1* 3/2003 Coughln ............. A61B 17/8061
606/70
(Continued)

FOREIGN PATENT DOCUMENTS

DE    10 2008 039 693 A1    3/2010
EP         2 606 843 A1    6/2013

OTHER PUBLICATIONS

European Search Report Corresponding to 19192018.0 mailed Feb. 13, 2020.
(Continued)

*Primary Examiner* — Marcela I. Shirsat
(74) *Attorney, Agent, or Firm* — Finch & Maloney PLLC

(57) ABSTRACT

The invention relates to a plate (10) for temporarily bridging fragments of a fracture having a proximal portion (11), a distal portion (12), and an intermediate portion (13) disposed between the proximal portion (11) and the distal portion (12). The proximal portion (11) has a proximal attachment zone (14) adapted to be applied and attached to a first tubular bone (1). The distal portion (12) has a distal attachment zone (15) adapted to be applied and attached to a second tubular bone (2). The intermediate portion (13) is adapted to bridge a joint (3) between the first tubular bone (1) and the second tubular bone (2) and thereby at least one further bone, in particular without attachment to the at least one further bone. The plate (10) has at least one curved region (16, 17) between the proximal attachment zone (14) and the distal attachment zone (15). Furthermore, the inven-
(Continued)

Figure 1:
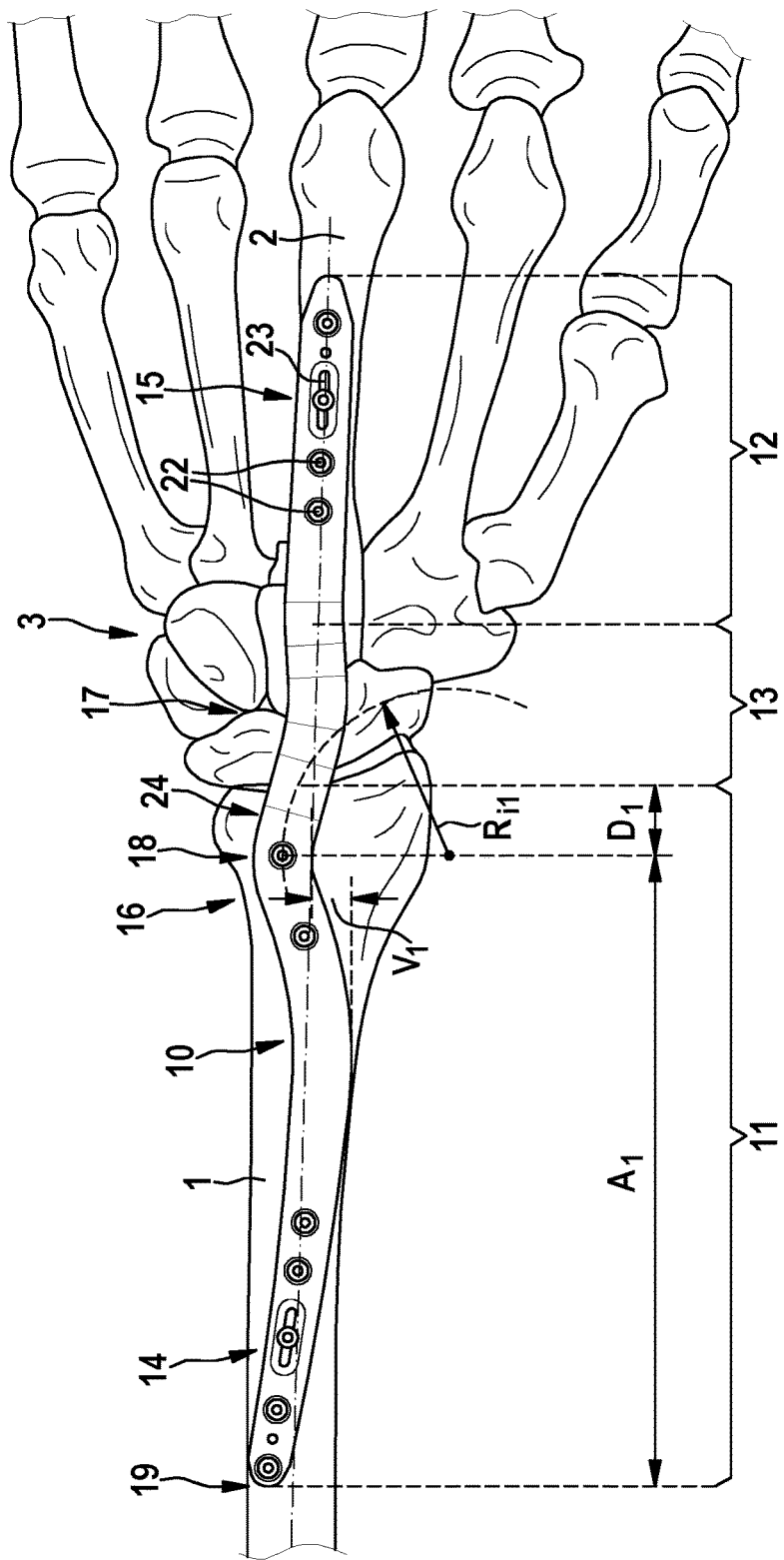

tion relates to a method for treating a complex joint fracture, in which in particular such a plate can be used.

18 Claims, 2 Drawing Sheets

(51) Int. Cl.
 *A61B 17/17* (2006.01)
 *A61B 17/58* (2006.01)
 *A61B 17/70* (2006.01)
(52) U.S. Cl.
 CPC ....... *A61B 17/1728* (2013.01); *A61B 17/1775* (2016.11); *A61B 17/1782* (2016.11); *A61B 17/58* (2013.01); *A61B 17/7058* (2013.01); *A61B 17/7059* (2013.01); *A61B 17/8014* (2013.01); *A61B 17/8052* (2013.01); *A61B 17/8057* (2013.01); *A61B 17/808* (2013.01)
(58) Field of Classification Search
 CPC ............ A61B 17/8052; A61B 17/8057; A61B 17/8085; A61B 17/1728; A61B 17/58; A61B 17/7058; A61B 17/7059; A61B 17/1686; A61B 17/1682; A61B 17/1782; A61B 17/1775

USPC ......... 606/281, 53, 280, 282, 283, 286, 291, 606/298–299, 86 R, 87, 104, 86 B, 105, 606/902, 906, 915

See application file for complete search history.

(56) References Cited

U.S. PATENT DOCUMENTS

| | | | |
|---|---|---|---|
| 2004/0102777 A1 | 5/2004 | Heubner | |
| 2006/0173458 A1* | 8/2006 | Forstein | A61B 17/1728 606/281 |
| 2009/0248084 A1* | 10/2009 | Hintermann | A61B 17/8004 606/280 |
| 2010/0131013 A1 | 5/2010 | Ralph et al. | |
| 2010/0217327 A1 | 8/2010 | Vancelette et al. | |
| 2013/0165979 A1* | 6/2013 | Greenberg | A61B 17/8061 606/280 |

OTHER PUBLICATIONS

International Search Report Corresponding to PCT/EP2020/072657 mailed Nov. 11, 2020.
Written Opinion Corresponding to PCT/EP2020/072657 mailed Nov. 11, 2020.

* cited by examiner

PLATE FOR TEMPORARILY BRIDGING FRAGMENTS OF A FRACTURE

The invention relates to a plate for temporary bridging of fragments of a fracture.

In the field of treatment of joint disorders, for example after surgical procedures to realign misaligned or deformed wrist bones, a surgeon may implant a joint plate. The plate is usually used to attach one or more bone fixation devices to desired locations on the joint bones. The plate is fixed in the desired position so that the bones of the joint have the desired alignments in relation to each other.

The intricate network of tendons, muscles and nerve endings in the joint can make proper fixation difficult. The surgeon must take as much care as possible not to damage the surrounding tissue when fixing the joint plate.

From DE 10 2008 039 693 A1, a wrist arthroplasty plate is known that has a widened carpal bone fixation section with through holes spaced transversely to the longitudinal direction of the wrist arthroplasty plate. To avoid soft tissue interference, the wrist arthroplasty plate has a material thickness of less than 3 mm. To fix the wrist in a relaxation situation, the carpal bone fixation section is spherical in shape, i.e. rises dorsally. The section can also be spoon shaped.

EP 2,606,843 B1 shows a wrist fusion plate whose central section is curved in the palmar direction from the longitudinal axis.

U.S. Pat. No. 5,853,413 shows a wrist fusion plate having a proximal end and a distal end, each extending away from a saddle region and each defining a longitudinal axis. The longitudinal axis of the distal end is not axially aligned in the medial-lateral direction with the longitudinal axis of the proximal end.

In the case of large complex fractures (polytrauma), it may be decided not to treat the fragments in detail at all, but only to bridge them temporarily, as it is not desirable to put any more stress on the patient. External reduction is used to try to bring the individual pieces of bone into their original position (ligamentotaxis). They then heal there more or less well. So-called tensioning plates are used to bridge this zone of debris. At the wrist, for example, the radius shaft is connected to the metacarpal while the fingers can remain mobile.

For temporary bridging of a wrist joint, mostly simply shaped plates extending in a longitudinal direction are used.

It is the task of the invention to present a plate for temporary bridging of fragments of a fracture, which avoids the disadvantages of the known and which in particular ensures that irritation of soft tissues is excluded or at least minimized.

The task is solved by a plate for temporary bridging of fragments of a fracture with the features of the independent claim.

The plate is preferably used for bridging bone fragments of a mammal, in particular a human.

The plate has a proximal portion, a distal portion, and an intermediate portion disposed between the proximal portion and the distal portion.

The proximal portion has a proximal attachment zone configured to be applied to and attached to a first tubular bone.

In particular, the proximal attachment zone is located in the proximal portion of the plate and occupies a maximum of 30% to 50%, and in particular a maximum of 25% to 30%, of the total length of the plate.

Alternatively or additionally, the proximal attachment zone is formed by that proximal region of the plate in which there are through holes whose respective distance from each other does not exceed the length of 20 mm. In other words, this means that in the proximal portion of the plate, through-holes may also be present in other portions. However, the attachment zone is defined only by a group of through holes that are sufficiently close to each other.

The proximal attachment zone may also be considered as that portion of the proximal portion which has substantially no curvature.

The proximal portion may define, in plan and/or lateral view, a first longitudinal axis along which it extends substantially.

The longitudinal axis of a section may be defined by a linear interpolation of centroids of cut surfaces of the plate, the cuts being perpendicular to the substantial direction of propagation of the section. For example, the cut surfaces may have contours given by the width and thickness of the plate in the plane of the cut.

The proximal attachment zone is preferably provided with through holes into which a fastener, such as a nail, screw or wire, can be inserted.

The distal portion has a distal attachment zone adapted to be applied and secured to a second tubular bone.

In particular, the distal attachment zone is located in the distal portion of the plate and occupies a maximum of 30% to 50%, and in particular a maximum of 25% to 30%, of the total length of the plate.

Alternatively or additionally, the distal attachment zone is formed by that distal region of the plate in which there are through holes whose respective distance from each other does not exceed the length of 20 mm. In other words, through-holes may also be present in other portions of the distal portion of the plate. However, the attachment zone is defined only by a group of through holes which are sufficiently close to each other.

The distal attachment zone may also be considered as that portion of the distal portion which has substantially no curvature.

The distal portion may define, in plan and/or lateral view, a second longitudinal axis along which it extends substantially. The longitudinal axis may result from a linear interpolation of the intersection centroids.

The distal attachment zone is preferably provided with through holes into which a fastener, such as a nail, screw or wire, may be inserted.

The intermediate portion is designed to bridge a joint between the first tubular bone and the second tubular bone and, in the process, at least one other bone.

In particular, the bridging is performed without attachment to the at least one further bone in the bridged region. Thus, no through hole need be arranged in the intermediate portion. It may be free of through holes for receiving fasteners.

For example, the proximal attachment zone may be configured to be applied and secured to a radius, while the distal attachment zone may be configured to be applied and secured to a metacarpal bone.

Alternatively, the proximal attachment zone may be configured to be attached to a tibia or talus, and the distal attachment zone may be configured to be attached to a metatarsal. Unless otherwise indicated, the dimensions given below refer to applications on the radius and meta-carpal bones. For applications to the tibia or talus and metatarsal, the dimensions of the plate should be adjusted according to the size ratios.

According to the invention, the plate has at least one curved region between the proximal attachment zone and the distal attachment zone.

By a curved region is meant a region in which the plate changes direction at least once, preferably at least twice, with respect to an alignment axis, for example with respect to the first or second longitudinal axis.

The plate is preferably formed substantially as an elongated, planar body, with a length that is greater than the width, in particular more than 10 times, and a thickness or material thickness that is less than the width. The width is, for example, between 2 mm and 25 mm, preferably between 5 mm and 15 mm, and the material thickness is, for example, between 1 mm and 5 mm, preferably between 2.8 mm and 3.8 mm, particularly preferably 3.4 mm.

The plate typically has an overall length of 10 cm to 30 cm, preferably 15 to 25 cm, particularly preferably about 20 cm.

The plate is preferably made of metal, for example titanium or a titanium alloy or implant steel. Other biocompatible materials are also conceivable, in particular also carbon, implantable plastics and combinations thereof.

In plan view, the plate extends substantially in an orientation that may preferably coincide with the longitudinal direction of one of the tubular bones, for example the proximal and/or distal tubular bone.

In lateral view, the plate preferably has two longitudinal axes corresponding to the longitudinal axes of the proximal and distal portions, which include an angle according to the desired joint fixation.

In the case of a joint to be fixed in a straight line, the longitudinal axes may coincide or be parallel to each other, at least in lateral view.

A first curved region may be curved in plan view.

The top view is directed to the side of the plate body on which the length and the width are apparent.

Preferably, the first curved region is Z-shaped or U-shaped.

In the case of a Z-shaped curvature, the orientation changes twice in a direction from the proximal end to the distal end, and in the case of a U-shaped curvature, the direction changes three times with respect to a substantial orientation of the proximal and/or distal portion, in particular the respective longitudinal axis.

The first curved region is preferably designed in such a way that irritation of soft tissues is excluded or at least minimized, in particular that space is provided for an extensor or flexor tendon.

If the tendons are constantly irritated during immobilization of the wrist, this can lead to injury to the tendons and stiffening of the fingers. The curved region ensures that the tendons have room and are not impacted by the plate.

A U-shaped area in plan view can be used, for example, when connecting a radius to a middle finger bone. The curvature leaves room for the finger tendons.

A Z-shaped curved region in plan view can be used, for example, when a radius is connected to an index finger bone or a ring finger bone. The curvature leaves room for the finger tendons.

The curvature of the first curved region may have a change in direction with an inner radius ($R_{i1}$) of 15 mm to 22 mm at the inner edge, in particular 19 mm. In particular, all directional changes have a corresponding inner radius.

The curvature of the first curved region may alternatively or additionally be designed to provide a lateral/side offset corresponding to at least half the width of the plate, typically at least about 3 mm.

The first curved region may have intermediate portions extending in a straight line.

The first curved region may alternatively or additionally have, in the direction from the proximal end to the distal end, a first change in direction by an angular amount of 10° to 60°, a second change in direction by an angular amount of 10° to 60°, and optionally a third change in direction by an angular amount of 10° to 60°. Typically, the direction changes in each case so that a Z-shape or a U-shape is formed in plan view.

The plate is preferably configured such that the first curved region is positionable at the distal end of the first tubular bone.

The first curved region may be located in the proximal portion and may also include through holes for attachment.

Preferably, at least one attachment hole is provided in at least one region where a change in direction occurs, preferably in the region of the second change in direction.

The location of the second change of direction of the first curved region, where there is typically a greatest lateral deflection of the plate, has a distance between 110 mm to 130 mm, preferably of 120 mm from the proximal end of the plate.

Alternatively or additionally, the plate can be designed such that the location of the second directional change of the first curved region can be located at a distance between 10 mm to 12 mm, preferably of 11 mm from the distal end of the first tubular bone (1).

This means that the location of the second directional change is at a distance of 10 mm to 12 mm, preferably of about 11 mm from the proximal end of the intermediate portion.

Alternatively or additionally, the second change of direction may be located at a distance of 25 mm to 45 mm, preferably 30 mm to 40 mm from the first change of direction.

In an advantageous embodiment of the plate, the plate comprises a second curved region which is curved in side view.

The side view is directed to the side of the plate body on which the length and thickness are apparent.

Preferably, the second curved region is curved in a Z-shape or a U-shape. Preferably, the curvature extends from the underside of the plate that can be directed against the bone. In the case of a U-shaped curvature, the legs and the base of the U-shaped cross-section therefore extend in particular from the underside of the plate which can be directed towards the bone, so that a depression is formed on the upper side as a result of the second curvature.

The second curved region is preferably disposed in the intermediate portion. Preferably, the second curved region does not include through holes and thus is not intended to be fixed to a bone.

In particular, the curvature of the second curved region is such that the second curved region can be slid under the soft tissues of the joint. For example, the plate may then be slidable under the tendons of the joint.

A plate with first and second curved regions can thus be slid around the soft tissues, leaving room for them to move.

The second curved region allows the plate to automatically assume the optimal position when applied, provided a size of plate is selected that is appropriate for the patient.

If the plate is designed as a wrist plate, it can be positioned at the distal radius in the extensor tendon compartments.

The curvature of the second curved region may have a change of direction with an inner radius ($R_{i2}$) of 12 mm to 18 mm at the edge of the plate facing the inner curvature, in particular 12 mm. In particular, all directional changes have such an inner radius.

The curvature of the second curved region may alternatively or additionally be selected such that the vertical offset (i.e., the offset with respect to the plane of the plate) is 1 mm to 10 mm, preferably 3 mm to 4 mm. The second curved region may have intermediate portions extending in a straight line.

The second curved region may have, in the direction from the proximal end to the distal end, a first change in direction by an angular amount of 10° to 60°, a second change in direction by an angular amount of 10° to 60°, and optionally a third change in direction by an angular amount of 10° to 60°. Typically, the direction changes in each case so that a Z-shape or a U-shape is formed in side view.

Preferably, the changes in direction are such that after a first, second, and optionally third change in direction (in a direction from the proximal end to the distal end), the longitudinal axes of the proximal and distal portions in side view include the angle of the desired joint position, i.e., the angle that the tubular bones to be connected are to include.

In an advantageous embodiment of the plate, the second curved region has a location of the second change in direction where typically the greatest vertical deflection of the plate occurs. For example, this location has a distance between 50 mm to 70 mm, preferably of 61 mm, from the distal end of the plate.

Alternatively or additionally, the plate is configured such that the location of the second directional change of the second curved region can be located at a distance between 10 mm to 15 mm, preferably of 11 mm, from the proximal end of the second tubular bone.

This means that the point of the second curved region having the greatest lateral/lateral distance from the area of the plate before the first change of direction is at a distance between 10 mm to 12 mm, preferably of 11 mm, from the proximal end of the distal portion.

In an advantageous embodiment of the plate, the through holes in the proximal attachment zone and/or in the first curved region and/or in the distal attachment zone are formed as at least one screw hole, oblong hole and/or K-wire hole.

By means of the K-wire hole, the plate can be pre-fixed so that under X-ray control the position can be checked before screwing.

The longitudinal axis of the proximal portion can include an angle of +45° to −45°, preferably 0°, with the longitudinal axis of the distal portion in plan view.

Even if the tubular bones to be connected are approximately aligned in plan view, for example a radius and a middle finger, it may be advantageous if the longitudinal axes enclose an angle in plan view. For example, a longitudinal axis may be arranged along the longitudinal axis of the distal tubular bone, which is typically smaller in diameter. The longitudinal axis of the proximal portion may also be inclined in plan view in the attached state relative to the longitudinal axis of the proximal tubular bone, depending on the bone model. A number of attachment holes along the longitudinal axis of the proximal end may be located on a shorter piece of the bone. Thus, the plate can be made shorter overall while achieving the same fixation stability.

The longitudinal axis of the proximal portion may include an angle of 45° to +45° with the longitudinal axis of the distal portion in lateral view. For a wrist plate, the longitudinal axes preferably include an angle of 12° in lateral view.

Advantageously, the thickness of the plate in the proximal portion decreases toward the proximal end and/or the thickness of the plate in the distal portion decreases toward the distal end.

In particular, the material thickness of a planar plate decreases towards the ends.

The plate can then be more easily inserted into the joint area and discontinuities in the bending moments are prevented at the transition between the plate and the bone.

The problem is further solved by a method for treating a complex joint fracture, where the joint is located between two tubular bones of a human patient.

A plate, preferably as described above, is provided for temporarily bridging fragments of the fracture, having a proximal portion, a distal portion, and an intermediate portion disposed between the proximal portion and the distal portion.

The proximal portion has a proximal attachment zone that is applied and secured to a first tubular bone.

The distal portion has a distal attachment zone that is applied and attached to the second tubular bone.

The intermediate portion bridges the joint between the first tubular bone and the second tubular bone and thereby at least one further bone, in particular without attachment to the at least one further bone.

The plate between the proximal attachment zone and the distal attachment zone includes at least one curved region.

The proximal attachment zone may be applied to and secured to a radius and the distal attachment zone may be applied to and secured to a metacarpal bone.

Alternatively, the proximal attachment zone may be attached to a tibia and the distal attachment zone may be attached to a metatarsal.

Preferred embodiments of the invention are described in more detail in the following description with reference to the accompanying drawings.

They show

Figure 2:
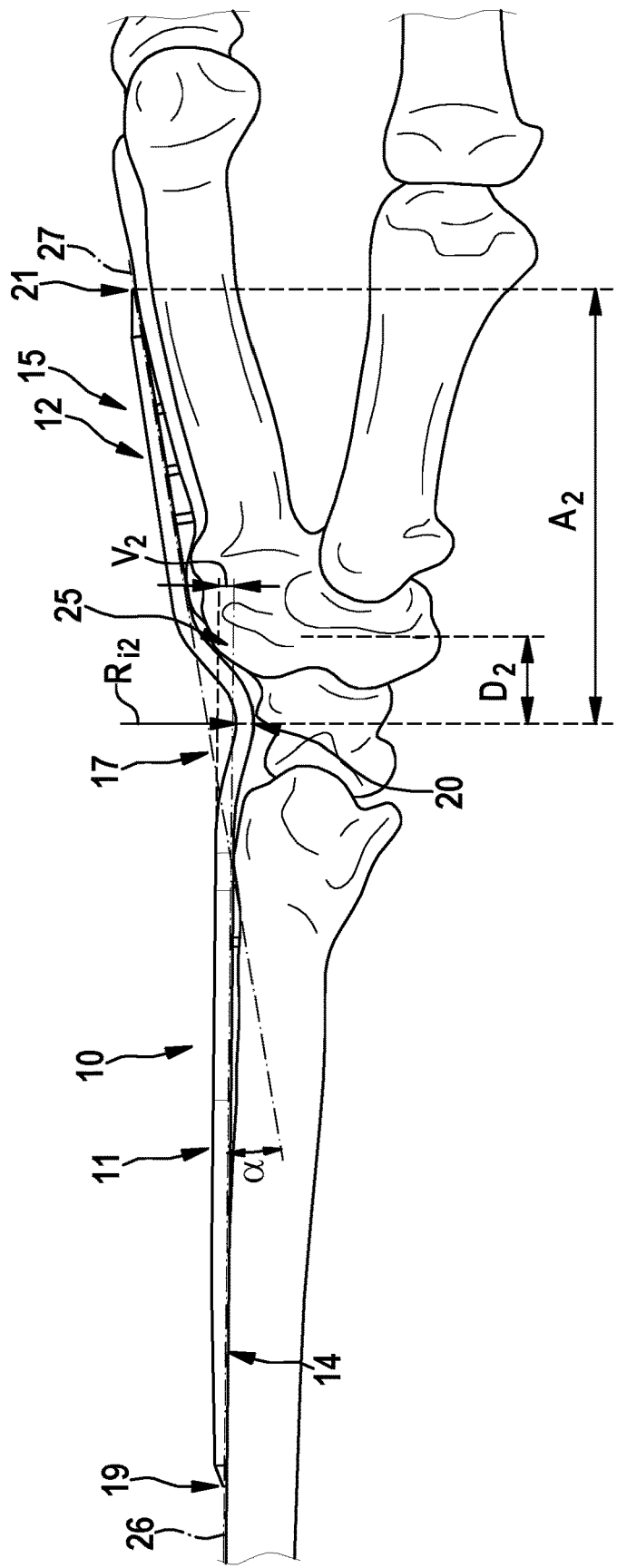

FIG. 1 a plate in plan view;

FIG. 2 a plate in lateral view.

FIG. 1 shows a plate 10 for temporary bridging of fragments of a wrist fracture in plan view. The plate 10 has a proximal portion 11, a distal portion 12, and an intermediate portion 13 located between the proximal portion 11 and the distal portion 12.

The proximal portion 11 has a proximal attachment zone 14 configured to be applied to and attached to a first tubular bone 1, in this case a radius.

The distal portion 12 has a distal attachment zone 15 adapted to be applied to and secured to a second tubular bone 2, in this case a middle finger bone.

The intermediate portion 13 bridges the wrist 3 between the radius 1 and the middle finger bone 2 and overlies the carpal bones.

The intermediate portion 13 is not attached to the carpal bones.

The plate 10 has a first curved region 16 between the proximal attachment zone 14 and the distal attachment zone 15, which is curved in a U-shape. The first curved region 16 is positioned at the distal end of the radius 1.

The plate 10 is therefore configured to prevent entrapment of extensor or flexor tendons (not shown here).

The curvature of the first curved region 16 has a location 18 of the second change of direction with an inner radius $R_{i1}$ of 15 mm to 22 mm, in particular of 19 mm.

The lateral offset V1 corresponds approximately to the average width of the plate and is about 10 mm.

The location 18 of the second change of direction with the greatest lateral deflection with the offset V1 can have a distance A1 of between 110 mm to 130 mm, preferably of 120 mm from the proximal end 19 of the plate 10.

The location 18 with the largest lateral deflection is preferably located at a distance D1 between 10 mm to 12 mm, preferably of 11 mm from the distal end of the radius 1.

Screw holes 22 are provided in the proximal attachment zone 14, in the first curved region 16 and in the distal attachment zone 15. An oblong hole 23 is also provided in each of the proximal attachment zone 14 and the distal attachment zone 15. In addition, a K-wire hole 24 is located in the first curved region 16.

FIG. 2 shows the plate 10 in lateral view.

The plate 10 has a second curved region 17 between the proximal attachment zone 14 and the distal attachment zone 15, which is curved in a U-shape in side view.

The second curved region 17 can be slid under the soft tissues of the joint not shown in the figure.

The location 20 of the second change in direction of the second curved region 17, where typically the greatest vertical deflection with an offset V2 is present, may have an inner radius $R_{i2}$ of from 12 mm to 18 mm, particularly 12 mm. The vertical offset V2 is approximately 3 mm.

The location 20 with the largest vertical deflection may have a distance A2 of between 50 mm to 70 mm, preferably of 61 mm, from the distal end 21 of the plate 10.

The location 20 of the second change in direction of the second curved region 17 may be located at a distance D2 between 10 mm to 12 mm, preferably of 11 mm, from the proximal end 25 of the middle phalanx.

The longitudinal axis 26 of the proximal portion 11 makes an angle α of about 12° with a longitudinal axis 27 of the distal portion 12 in lateral view.

The thickness of the plate 10 decreases toward the ends 19, 21 of the plate.

|  | Hand large | Hand medium | Hand small |
| --- | --- | --- | --- |
| Length (mm) | 230 | 200 | 170 |
| Width (mm) | 12 | 10 | 8 |
| Thickness (mm) | 5 | 3.5 | 2 |
| $D_1$ (mm) | 13 | 11 | 9 |
| $A_1$ (mm) | 105 | 120 | 135 |
| $D_2$ (mm) | 12 | 11 | 10 |
| $A_2$ (mm) | 60 | 55 | 45 |
| $R_{i1}$ (mm) | 25 | 19 | 5 |
| $R_{i2}$ (mm) | 20 | 12 | 2 |
| α (°) | 12 | 12 | 12 |
| $V_1$ (mm) | 8 | 5 | 3 |
| $V_2$ (mm) | 7 | 5 | 3 |

The invention claimed is:

1. A plate for temporarily bridging fragments of a fracture comprising a proximal portion, a distal portion and an intermediate portion disposed between the proximal portion and the distal portion, wherein
    the proximal portion having an elongate and substantially straight proximal attachment zone adapted to be applied to and secured to a first tubular bone
    said distal portion having an elongate and substantially straight distal attachment zone adapted to be applied and secured to a second tubular bone, and
    the intermediate portion is adapted to bridge a joint between the first tubular bone and the second tubular bone, and wherein the intermediate portion is further configured to bridge at least one further bone positioned between, and different from, the first tubular bone and second tubular bone, the intermediate portion not being attachable to the at least one further bone,
    wherein
    the plate has a first curved region between the proximal attachment zone and the distal attachment zone, wherein the first curved region is curved as seen in plan view,
    the intermediate portion, the proximal portion, and the distal portion defining a longitudinal axis of the plate, wherein the first curved region has a first change of direction and a second change of direction in plan view, the second change of direction being at a distance from the first change of direction along the longitudinal axis, both the first and second change of direction being by an angle between 10° and 60°, the second change of direction being in a direction opposite the first change of direction.

2. The plate according to claim 1, wherein the proximal attachment zone is adapted to be applied and attached to a radius and the distal attachment zone is adapted to be applied and attached to a metacarpal bone.

3. The plate according to claim 1, wherein the proximal attachment zone is adapted to be attached to a tibia and the distal attachment zone is adapted to be attached to a metatarsal.

4. The plate according to claim 1, wherein the curvature of the first curved region is designed in such a way that irritations of soft tissues are excluded or at least minimized.

5. The plate according to claim 1, further comprising at least one of
    a curvature of the first curved region having an inner radius of 15 mm to 22 mm,
    a curvature of the first curved region resulting in at least a first change of direction by an angular amount of 10° to 60°, and
    a curvature of the first curved region resulting in a lateral offset which is at least 3 mm.

6. The plate according to claim 5, having a second change of direction in the first curved region, wherein a location of the second change of direction of the first curved region has a distance between 110 mm to 130 mm from a proximal end of the plate.

7. The plate according to claim 6, wherein the location of the second change of direction of the first curved region is configured to be arranged at a distance between 10 mm and 12 mm from a distal end of the first tubular bone.

8. The plate according to claim 1, wherein the first curved region is positionable at the distal end of the first tubular bone.

9. The plate according to claim 1, wherein a second curved region is curved in side view, preferably Z-shaped or U-shaped.

10. The plate according to claim 9, wherein a curvature of the second curved region is such that the second curved region is slidable under the soft tissues of the joint.

11. The plate according to claim 9, further comprising at least one of:
    a curvature of the second curved region having at least one change of direction with an inner radius of 12 mm to 18 mm,
    a curvature of the second curved region having at least a first change in direction by an angular amount of from 10° to 60°, and
    a curvature of the second curved region resulting in a vertical offset which is at least 3 mm.

12. The plate according to claim 11, having a second change of direction of the second curved region, wherein a location of the second change of direction of the second curved region has at least one of the following:
  a distance of between 50 mm to 70 mm from a distal end of the plate, or
  is adapted to be arranged at a distance between 10 mm to 12 mm from a proximal end of the second tubular bone.

13. The plate according to claim 9, wherein the second curved region is arranged in the intermediate portion.

14. The plate according to claim 9, wherein the second curved region does not contain through holes.

15. The plate according to claim 1, having at least one of a screw hole, an oblong hole, and a K-wire hole arranged in at least one of the proximal attachment zone, the first curved region, the second curved region, and the distal attachment zone.

16. The plate according to claim 1, wherein a longitudinal axis of the proximal portion encloses an angle of +45° to −45° with a longitudinal axis of the distal portion in at least one of a plan view and a lateral view.

17. The plate according to claim 1, further comprising at least one of
  a thickness of the plate in the proximal portion becoming smaller towards a proximal end, and
  a thickness of the plate in the distal portion becoming smaller towards a distal end.

18. The plate according to claim 1, wherein the first curved region comprises at least one through hole.

\* \* \* \* \*